United States Patent
Bolotnikov et al.

(10) Patent No.: US 7,858,949 B2
(45) Date of Patent: Dec. 28, 2010

(54) MULTI-ANODE IONIZATION CHAMBER

(75) Inventors: Aleksey E. Bolotnikov, South Setauket, NY (US); Graham Smith, Port Jefferson, NY (US); George J. Mahler, Rocky Point, NY (US); Peter E. Vanier, Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 137 days.

(21) Appl. No.: 12/175,869

(22) Filed: Jul. 18, 2008

(65) Prior Publication Data

US 2010/0012851 A1    Jan. 21, 2010

(51) Int. Cl.
  *H01J 47/00* (2006.01)
(52) U.S. Cl. .................................. 250/385.1
(58) Field of Classification Search ............... 250/385.1
  See application file for complete search history.

(56) References Cited

U.S. PATENT DOCUMENTS

| | | | |
|---|---|---|---|
| 2,657,315 A * | 10/1953 | Goldstein ................. | 250/385.1 |
| 3,548,207 A * | 12/1970 | Sinclair ...................... | 250/388 |
| 3,666,950 A * | 5/1972 | Ferber et al. ............. | 250/385.1 |
| 3,753,020 A | 8/1973 | Zingaro | |
| 4,047,040 A | 9/1977 | Houston | |
| 4,055,767 A | 10/1977 | Allemand | |
| 4,131,799 A | 12/1978 | Stieber | |
| 4,420,689 A | 12/1983 | Rogers et al. | |
| 4,880,983 A | 11/1989 | Markey | |
| 5,500,534 A * | 3/1996 | Robinson et al. ......... | 250/385.1 |
| 6,046,454 A * | 4/2000 | Lingren et al. ......... | 250/370.01 |
| 6,452,191 B1* | 9/2002 | Johnson et al. .......... | 250/385.1 |
| 6,486,468 B1 | 11/2002 | Lacy | |
| 6,747,271 B2 | 6/2004 | Gonin et al. | |
| 6,909,090 B2 | 6/2005 | Gonin et al. | |
| 7,135,688 B2 | 11/2006 | Beyerle | |
| 7,180,243 B2 | 2/2007 | Secheresse et al. | |
| 2003/0150999 A1* | 8/2003 | Buffet et al. ............. | 250/385.1 |

OTHER PUBLICATIONS

Athanasiades et al. Position sensing in a cylindrical ionization detector through use of a segmented cathode, Nov. 4-10, 2001 IEEE Nuclear Science Symposium Conference Record, San Diego, CA, USA, vol. 2 (Aug. 2002), pp. 1151-1155.*

(Continued)

*Primary Examiner*—David P Porta
*Assistant Examiner*—Shun Lee
(74) *Attorney, Agent, or Firm*—Dorene M. Price

(57) ABSTRACT

The present invention includes a high-energy detector having a cathode chamber, a support member, and anode segments. The cathode chamber extends along a longitudinal axis. The support member is fixed within the cathode chamber and extends from the first end of the cathode chamber to the second end of the cathode chamber. The anode segments are supported by the support member and are spaced along the longitudinal surface of the support member. The anode segments are configured to generate at least a first electrical signal in response to electrons impinging thereon.

27 Claims, 8 Drawing Sheets

OTHER PUBLICATIONS

A. Bolotnikov and B. Ramsey, "Improving the Energy Resolution of High-pressure Xe Cylindrical Ionization Chambers," *IEEE Trans. on Nuc. Sci.*, 44(3):1006-1010 (1997).

S.D. Kiff, "Coplanar Anode Implementation in Compressed Xenon Ionization Chambers," A dissertation submitted in partial fulfillment of the requirements for the degree of Doctor of Philosophy (Nuclear Engineering and radiological Sciences) in the University of Michigan), pp. 1-72 (2007).

S.D. Kiff, Z. He, G.C. Tepper, "Improving Spectroscopic Performance of a Coplanar-Anode High-Pressure Xenon Gamma-Ray Spectrometer," *IEEE Nuc. Sci. Symp. Conf. Record*, 1048-1051 (2006).

A. Bolotnikov, A. Bolozdynya, R. DeVito and J. Richards, "Dual-Anode High Pressure Xenon Cylindrical Ionization Chamber," *IEEE Trans. on Nuc. Sci.*, 51(3):1262-1269 (2004).

Z. Hu, Z. Guo, W. Zhan, G. Xiao, H. Xu, Z. Sun, M. Wang, R. Mao, Z. Chen, L. Chen, C. Li, J. Bai, J. Zhang and C. Li, "A Multi-Anode Transverse Field Gas Ionization Chamber,", *High Energy Phys. and Nuc. Phys.*, vol. 27, No. 10 (Oct. 2003) (with translation).

P.E. Dresel, S.R. Waichler, "Evaluation of Xenon Gas Detection as a Means for Identifying Buried Transuranic Waste at the Radioactive Waste Management Complex, Idaho National Environmental and Engineering Laboratory,"Prepared for the U.S. Department of Energy under Contract DE-AC06-76RL01830, Pacific Northwest National Laboratory, PNNL-14617 (2004).

"Hi-Star Area Detector," *Bruker Advanced X-Ray Solutions—Bruker axs* (2001).

C.J. Gross, T.N. Ginter, D.Shapira, W.T. Milner, J.W. McConnell, A.N. James, J.W. Johnson, J. Mas, P.F. Mantica, R.L. Auble, J.J. Das, J.L. Blakenship, J.H. Hamilton, R.L. Robinson, Y.A. Akovali, C. Baktash, J.C. Batchelder, C.R. Bingham, M.J. Brinkman, H.K. Carter, R.A. Cunningham, T. Davison, J.D. Fox, A. Galindo-Uribarri, R. Grzywacz, J.F. Liang, B.D. MacDonald, J. MacKenzie, S.D. Paul, A. Piechaczek, D.C. Radford, A.V. Ramayya, W. Reviol, D. Rudolph, K. Rykaczewski, K.S. Toth, W. Weintraub, C. Williams, P.J. Woods, C.-H. Yu, and E.F. Zganjar, "Performance of the Recoil Mass Spectrometer and its Detector Systems at the Holifield Radioactive Ion Beam Facility," (1999).

Company Profiles, *Advanced Instrument Development, Inc.*, One-Source Information Services, Inc., Dec. 1, 2006.

Company Profiles, *Ordela, Inc.*, One-Source Information Services, Inc., Dec. 1, 2006.

Company Profiles, *GE Reuter-Stokes*, One-Source Information Services, Inc., May 9, 2006.

*Ion Track Inc.*, Excerpt from Form Type: S-1, Filed: Jun. 14, 2002, Edgar Online, Inc.

*Bruker Biosciences Corp.*, Excerpt from Exhibit Type: Exhibit 10—Material Contracts, Filed: Apr. 14, 2000, Edgar Online, Inc.

*Photoelectron Corp.*, Excerpt from Exhibit Type: Exhibit 10—Material Contracts, Filed: Mar. 31, 2000, Edgar Online, Inc.

A. Bolotnikov and B. Ramsey, "Improving the Energy Resolution of High-pressure Xe Cylindrical Ionization Chambers," *IEEE Trans. on Nuc. Sci.*, 44(3):1006-1010 (1997). [Year of publication is sufficiently earlier than effective US filing such that particular month of publication is not in issue.].

S.D. Kiff, "Coplanar Anode Implementation in Compressed Xenon Ionization Chambers," A dissertation submitted in partial fulfillment of the requirements for the degree of Doctor of Philosophy (Nuclear Engineering and radiological Sciences) in the University of Michigan), pp. 1-72 (Aug. 2007).

V.V. Dmitrenko, I.V. Chernysheva, V.M. Gratchev, O.N. Kondakova, K.V. Krivova, S.E. Ulin, Z.M. Uteshev, K.F. Vlasik, "Vibrostability of High Pressure Xenon Gamma-Ray Detectors.," *IEEE*, 665-669(2000). [Year of publication is sufficiently earlier than effective US filing such that particular month of publication is not in issue.].

S.E. Ulin, V.V. Dmitrenko, V.M. Grachev, Z.M. Uteshev, K.F. Vlasik, I.V. Chernysheva, A.G. Dukhvalov, F.G. Kotler, K.N. Pushkin, "Gamma-Detectors Based on High Pressure Xenon: Their Development and Application," *Moscow Engineering and Physics Institute (State University)* 31, Kashirskoe shosse, Moscow, 115409, Russia, (2004). [Year of publication is sufficiently earlier than effective US filing such that particular month of publication is not in issue.].

G.J. Mahler, B.Yu, G.C. Smith, W.R. Krane and J.R. Lemley, "A Portable Gamma-Ray Spectrometer Using Compressed Xenon*," *IEEE*, pp. 769-773 (1998). [Year of publication is sufficiently earlier than effective US filing such that particular month of publication is not in issue.].

S.D. Kiff, Z. He, G.C. Tepper, "Improving Spectroscopic Performance of a Coplanar-Anode High-Pressure Xenon Gamma-Ray Spectrometer," *IEEE Nuc. Sci. Symp. Conf. Record*, 1048-1051 (2006). [Year of publication is sufficiently earlier than effective US filing such that particular month of publication is not in issue.].

A. Bolotnikov, A. Bolozdynya, R. DeVito and J. Richards, "Dual-Anode High Pressure Xenon Cylindrical Ionization Chamber," *IEEE Trans. on Nuc. Sci.*, 51(3):1262-1269 (2004). [Year of publication is sufficiently earlier than effective US filing such that particular month of publication is not in issue.].

Z. Hu, Z. Guo, W. Zhan, G. Xiao, H. Xu, Z. Sun, M. Wang, R. Mao, Z. Chen, L. Chen, C. Li, J. Bai, J. Zhang and C. Li, "A Multi-Anode Transverse Field Gas Ionization Chamber,", *High Energy Phys. and Nuc. Phys.*, vol. 27, No. 10 (Oct. 2003) (with translation). [Year of publication is sufficiently earlier than effective US filing such that particular month of publication is not in issue.].

P.E. Dresel, S.R. Waichler, "Evaluation of Xenon Gas Detection as a Means for Identifying Buried Transuranic Waste at the Radioactive Waste Management Complex, Idaho National Environmental and Engineering Laboratory,"Prepared for the U.S. Department of Energy under Contract DE-AC06-76RL01830, Pacific Northwest National Laboratory, PNNL-14617 (2004). [Year of publication is sufficiently earlier than effective US filing such that particular month of publication is not in issue.].

"Hi-Star Area Detector," *Bruker Advanced X-Ray Solutions—Bruker axs* (2001). [Year of publication is sufficiently earlier than effective US filing such that particular month of publication is not in issue.].

C.J. Gross, T.N. Ginter, D.Shapira, W.T. Milner, J.W. McConnell, A.N. James, J.W. Johnson, J. Mas, P.F. Mantica, R.L. Auble, J.J. Das, J.L. Blakenship, J.H. Hamilton, R.L. Robinson, Y.A. Akovali, C. Baktash, J.C. Batchelder, C.R. Bingham, M.J. Brinkman, H.K. Carter, R.A. Cunningham, T. Davison, J.D. Fox, A. Galindo-Uribarri, R. Grzywacz, J.F. Liang, B.D. MacDonald, J. MacKenzie, S.D. Paul, A. Piechaczek, D.C. Radford, A.V. Ramayya, W. Reviol, D. Rudolph, K. Rykaczewski, K.S. Toth, W. Weintraub, C. Williams, P.J. Woods, C.-H. Yu, and E.F. Zganjar, "Performance of the Recoil Mass Spectrometer and its Detector Systems at the Holifield Radioactive Ion Beam Facility," (1999). [Year of publication is sufficiently earlier than effective US filing such that particular month of publication is not in issue.].

Company Profiles, *Advanced Instrument Development, Inc.*, One-Source Information Services, Inc., Dec. 1, 2006. [Year of publication is sufficiently earlier than effective US filing such that particular month of publication is not in issue.].

Company Profiles, *Ordela, Inc.*, One-Source Information Services, Inc., Dec. 1, 2006. [Year of publication is sufficiently earlier than effective US filing such that particular month of publication is not in issue.].

Company Profiles, *GE Reuter-Stokes*, One-Source Information Services, Inc., May 9, 2006. [Year of publication is sufficiently earlier than effective US filing such that particular month of publication is not in issue.].

*Ion Track Inc.*, Excerpt from Form Type: S-1, Filed: Jun. 14, 2002, Edgar Online, Inc. [Year of publication is sufficiently earlier than effective US filing such that particular month of publication is not in issue.].

*Bruker Biosciences Corp.*, Excerpt from Exhibit Type: Exhibit 10—Material Contracts, Filed: Apr. 14, 2000, Edgar Online, Inc. [Year of publication is sufficiently earlier than effective US filing such that particular month of publication is not in issue.].

*Photoelectron Corp.*, Excerpt from Exhibit Type: Exhibit 10—Material Contracts, Filed: Mar. 31, 2000, Edgar Online, Inc. [Year of publication is sufficiently earlier than effective US filing such that particular month of publication is not in issue.].

S.E. Ulin, V.V. Dmitrenko, A.M. Galper, K.F. Vlasik, Z.M. Uteshev, P.G. Dvornyak, A.D. Ischenko, N. A. Ivanova, V.Y. Gecha, and A.K. Boyartchuk, "Application of Xenon Gamma-Ray Detectors in Portal Monitoring for Detection and Identification of Radioactive and Fissile Materials," Proc. Of SPIE. vol. 6319, 631917-1 (2006). [Year of publication is sufficiently earlier than effective US filing such that particular month of publication is not in issue.].

* cited by examiner

MULTI-ANODE IONIZATION CHAMBER

The present invention was made with Government support under Contract No. DE-AC02-98CH10886 awarded by the U.S. Department of Energy. The United States Government has certain rights in the invention.

BACKGROUND

Ionization chambers have existed for several decades. Recently, ionization chambers have been developed for various applications, such as non-destructive testing, nuclear treaty verification, geological exploration, and the like. Among these chambers, high pressure xenon (HPXe) cylindrical ionization chambers are commonly used because of the robustness and cost effectiveness of the configuration.

Conventional cylindrical ionization chambers can employ a pressurized cylindrical vessel, an inner surface of which can function as a cathode. One or more anode wires or tubes can be disposed within the chamber traversing the chamber from one end to the other along its central axis. The chamber is generally filled with compressed xenon gas, which generates electron-ion pairs in response to incident high-energy photons, such as gamma rays. An electrical field generated between the cathode and anode wire(s) or tube(s) causes free electrons, resulting from absorption of high-energy photons in xenon, to drift towards the anode wire(s) or tube(s), where the electrons are collected by the wire(s) or tube(s). The charge induced at the anode by the electrons is converted into an electrical signal, a pulse-height of which can be measured.

In ionization detectors operating as electron-only carrier devices, the pulse-height is directly proportional to a total number of electrons collected at the anode minus the charge induced by the immobile ions, which is equivalent to integration of the current induced by the electrons while they drift toward the anode. The charge induced by the immobile ions depends on the ions location inside the chamber. As a result, the height of the output signal can be dependent on a point of interaction of the high-energy photons. To minimize the effect of the uncollected positive ions, a Frisch-grid is placed inside the chamber to electrostatically shield the anode from the ions, although other techniques can be used to achieve the same effect.

Because of large sizes of the electrodes resulting in large electrical capacitance, conventional cylindrical ionization chamber detectors are sensitive to noise, electrical and acoustic, which degrades the performance of these detectors. For example, sound waves can spread within the ionization chamber medium (e.g., compressed xenon) changing the local density and dielectric constant of the xenon, which in turn can affect the energy resolution achievable by the detectors. Fluctuations of the dielectric constant induce noise signals referred to herein as acoustic noise.

SUMMARY

The preferred embodiments of the present invention include a high-energy detector having a cathode chamber, a support member, and anode segments. The cathode chamber extends along a longitudinal axis from a first end to a second end. The support member is fixed within the cathode chamber, can extend from the first end of the cathode chamber to the second end of the cathode chamber, and can have a longitudinal surface running the length of the cathode chamber. The anode segments are supported by the support member and are spaced along the longitudinal surface of the support member. The anode segments are configured to generate at least a first electrical signal in response to electrons impinging thereon.

In some embodiments, the high-energy detector can include at least one spoke extending between the support member and at least one of the anode segments to mount at least one of the anode segments to, and spaced away from, the support member. At least one spoke can have an internal cavity through which an electrical conductor is routed to electrically connect at least one of at least one of the anode segments and at least one electronic component. In other embodiments, at least one of the anode segments is disposed in contact with the support member.

The anode segments are positioned to facilitate an identification of at least one location associated with a point of interaction of high-energy photons within the cathode chamber. The location identified can represent a position of interaction along the longitudinal axis and/or a position of interaction about the support member. In some embodiments, at least one of the anode segments has an annular configuration surrounding the support member and/or at least one of the anode segments has an arc-like configuration at least partially surrounding the support member. At least one of the anode segments can have a capacitance of less than about 15 picofarads (pF), or in some embodiments, less than about 5 picofarads (pF).

The support member can have a cavity through which the first electrical signal is routed. The cavity may be maintained at approximately 1 atmosphere pressure. At least one electronic component can be disposed within the support member and can be electrically connected to at least one of the anode segments to receive the first electrical signal for processing. The at least one of the anode segments can be spaced away from the support member.

High-energy photons, as well as high-energy particles such as neutrons, can be detected using the chamber having a detector medium disposed therein. To achieve this, a first electrical potential is applied at the cathode disposed on an internal surface of the chamber and a second electrical potential is applied at one or more of the anode segments spaced longitudinally along a support member disposed within the chamber. The detector medium is exposed to high-energy photons to liberate electrons. The first and second electrical potentials create an electric field sufficient to cause the liberated electrons to drift towards at least one of the one or more anode segments.

The liberated electrons can be collected by the one or more anode segments, where the liberated electrons can induce an electrical charge in the one or more anode segments. An electrical signal associated with the electrical charge can be sent from the one or more anode segments to at least one electronic component disposed within the support member.

A location of an interaction can be determined between the high-energy photons and the detector medium. The location can correspond to a position along the longitudinal axis of the chamber and/or a position about the support member.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 2A depicts a cross-sectional view of the high-energy detector of FIG. 1 along the line 2a-2a.

DETAILED DESCRIPTION

The preferred embodiments of the present invention include ionization chamber detectors configured to have low noise interference, electrical and acoustic, and to have spatial resolution to facilitate a determination of a location at which high-energy photons, such as gamma rays, x-rays, and the like, and high-energy particles, such as neutrons, interact within the detectors. These detectors can be advantageously implemented to safeguard employees working around radioactive materials, prevent the removal of radioactive materials from secure locations by installing the detectors within a portal monitoring system, investigate areas that have been exposed to radioactive materials, and detect the proliferation of weapons of mass destruction, e.g., detect weapon-grade plutonium, and perform other similar functions.

The ionization chamber detectors can include a cathode chamber capable of holding, preferably under pressure, a detector medium that generates electron-ion pairs when exposed to high-energy photons, e.g., gamma rays or X-rays. Anode segments can be disposed within the cathode chamber and can be mounted on a support member so that there is a space between a surface of the cathode chamber and the anode segments. The ionization chamber detectors described herein advantageously minimize the effects of noise, electrical and acoustic, to provide high-energy resolution of less than about 2.5% fall wave half maximum (FVHM) at 662 kilo electron Volts (keV) and can enable spatial resolution of high-energy photon interaction within the chamber so that the location(s) at which the high-energy photons interact can be determined.

Figure 1:
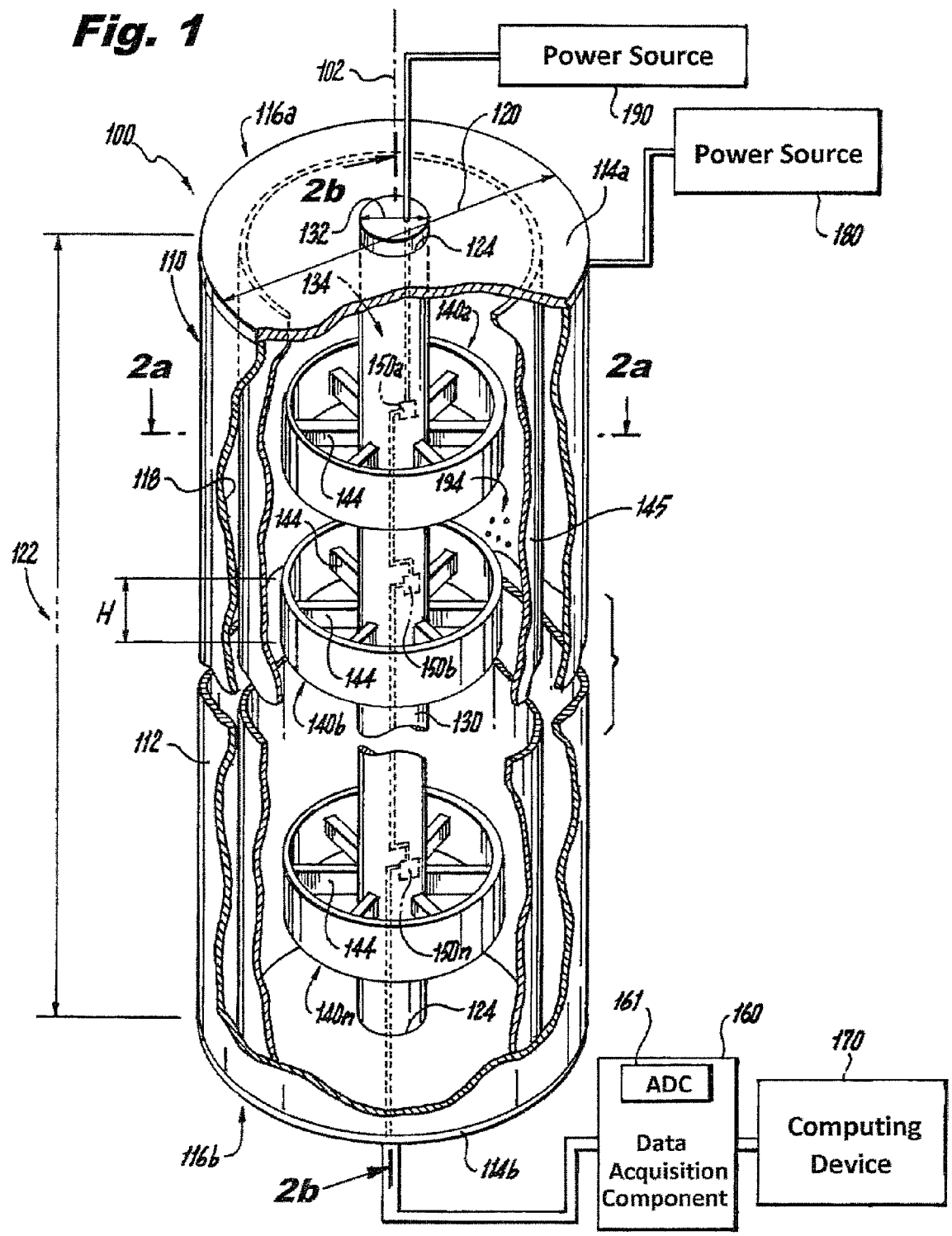
FIG. 1 depicts a high-energy detector having annular anode segments.
Figure 2A:
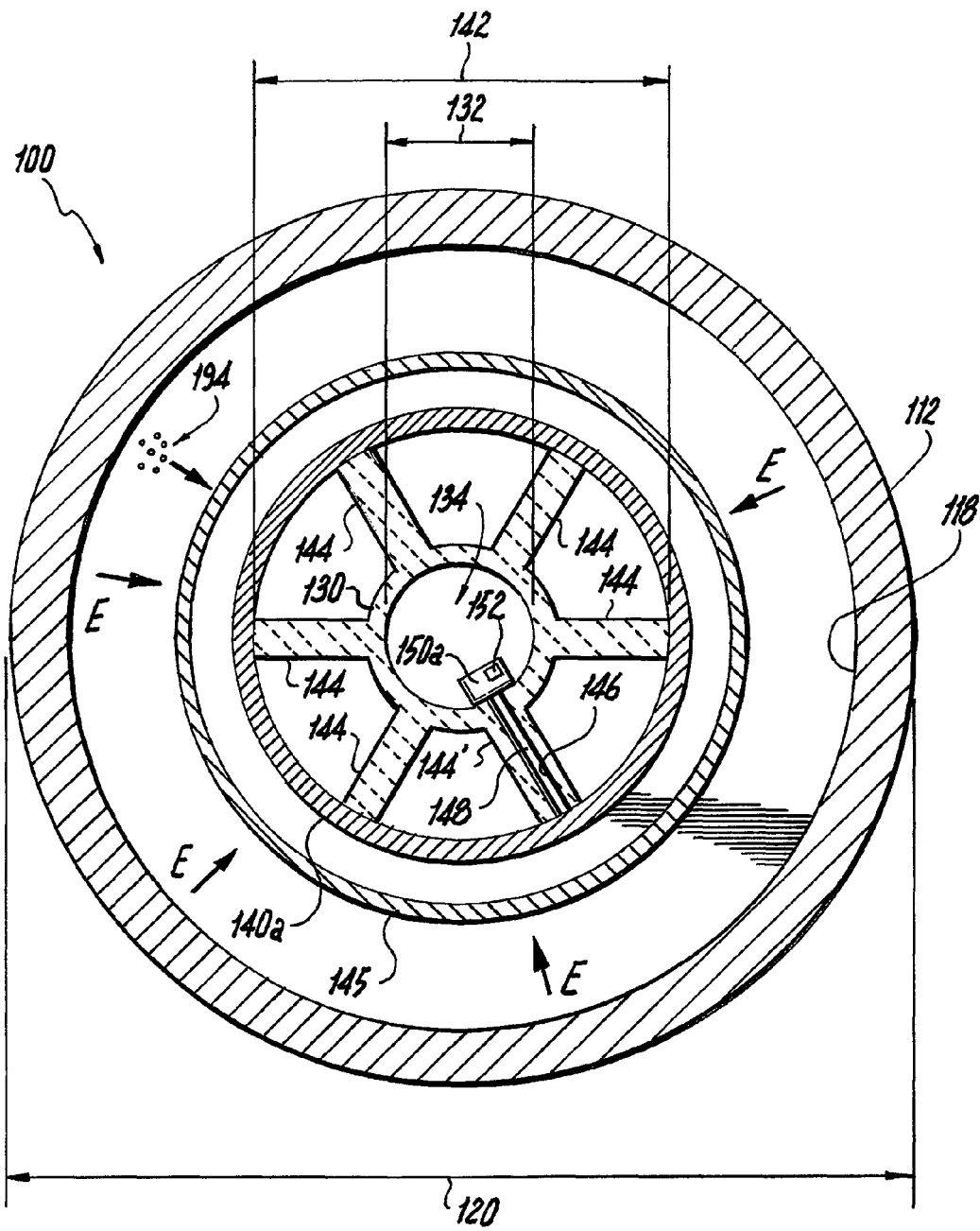
Figure 2B:
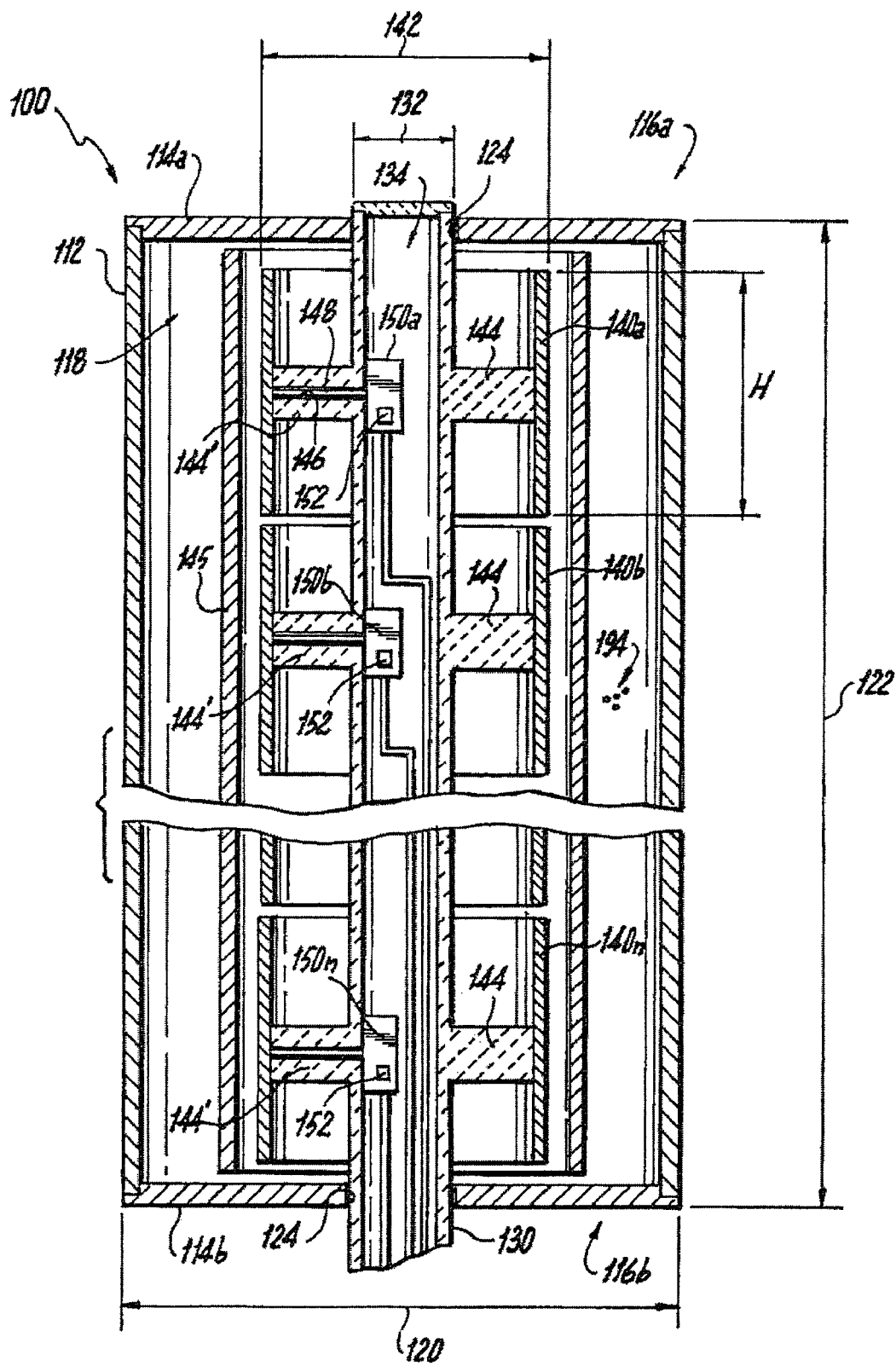
FIG. 2B depicts a cross-sectional view of the high-energy detector of FIG. 1 along the line 2b-2b

FIGS. 1, 2a and 2b depict a preferred embodiment of a high energy detector 100 that includes pressurized cathode chamber 110 (hereinafter "chamber 110"), a support member 130, anode segments 140a-n, preferably a Frisch grid 145, electronic components 150a-n, at least one data acquisition component 160, and at least one computing device 170. The chamber 110 can have a generally cylindrical longitudinal body 112 extending along a longitudinal axis 102 with flanges 114a-b disposed at each end 116a-b of the chamber 110 to substantially seal the chamber 110, although other configurations can be implemented. The chamber 110 can have a diameter 120 and a length 122. In one embodiment, the chamber 110 can have a volume of up to about 10 liters. An internal surface of the chamber body 112 can be an electrode formed from an electrically conductive material, such as aluminum, copper, gold, silver, and the like, which can function as a cathode 118. One or both of the flanges 114a-b can have an opening 124 through which the support member 130 can extend.

The chamber 110 can be filled with a detector medium in a gaseous or condensed state, and can be sealed such that the detector medium remains in the chamber 110 under a desired pressure. The detector medium can be held in the chamber under pressure, for example, from about 20 to about 100 bar, and is preferably held at about 50 to about 70 bar. In one embodiment, the detector medium can be held at about 60 bar. The detector medium can be a noble gas, such as xenon (Xe), argon (Ar), and krypton (Kr), or combinations of these gases with or without organic admixtures. Small amounts of helium-3 or other gases may be added to improve sensitivity to certain desired photons or particles. Condensed (liquid or solid) noble gases can also be used. Xenon is preferably used because of its high stopping power of high-energy photons, such as gamma rays. When high-energy photons are incident upon one or more particles of the detector medium, the particles are ionized and one or more electrons are liberated forming electron-ion pairs. An electric field between the cathode 118 and anode segments 140a-n cause the liberated electrons to drift towards the anode segments 140a-n.

The support member 130 can form an inner wall of the chamber 110 and can be formed from a material which is substantially impermeable to electromagnetic radiation so that the support member 130 functions as an electromagnetic shield. For example, the support member 130 can be formed of a metal including, such as stainless steel, although one skilled in the art will recognize that other materials can be used. The support member 130 can have a cylindrical tube or conduit configuration having a diameter 132, can have generally rectangular configuration, or can have another suitable configuration, and can extend along the longitudinal axis 102 between the ends 116a-b of the chamber 110 and through the openings 124 in the flanges 114a-b. An internal cavity 134 can be disposed in the support member 130 through which electrical signals can be routed and in which the electronic components 150a-n can be disposed. The internal cavity 134 may be held at a pressure different from the detecting medium, including 1 atmosphere pressure. The electrical signals and electronic components 150a-n are substantially shielded from electromagnetic radiation by the support member 130.

In the present embodiment, the anode segments 140a-n have a generally annular shape and are disposed about the support member 130. The annular anode segments 140a-n can have a diameter 142 that is greater than the diameter 132 of the support member 130 and can have a broad annular surface with a height H. The diameter 142 of the anode segments 140a-n can have a range, for example, from about 10 mm to about 40 mm and preferably from about 15 mm to about 25 mm. The height H of the annular surface of the anode segments 140a-n can range, for example, from about 5 mm to about 300 mm or greater and preferably from about 10 mm to about 100 mm so that multiple anode segments 140a-n can be disposed at discrete and various positions with respect to the longitudinal axis 102. A capacitance associated with one of the anode segments (e.g. anode segment 140a) can be determined, in part, based on a surface area of the anode segment, where a larger surface area results in a larger capacitance, and the dielectric constant of the detector medium. The anode segments 140a-n can be configured to have small capacitances, for example, less than 15 picofarads (pF) and preferably less than 5 pF.

The anode segments 140a-n are generally independent and distinct structures that are spaced away from the body 112 of the chamber 110 and that can be mounted on the support member 130 via spokes 144 at various positions along and coaxially about the longitudinal surface of the support member 130. The spokes 144 are preferably formed from an insulating material, such as a ceramic material, including alumina or other suitable insulating materials. At least one spoke 144' connecting anode segments 140a-n to the support member 130 can have a hollowed cavity 146 (FIGS. 2A and 2B) configured as a feed-through so that the anode segments 140a-n can be electrically connected to the electronic components 150a-n housed within the support member 130, for example, using an electrically conductive material 148 (FIGS. 2A and 2B), such as a metal wire, which may be insulated. In one embodiment, the spoke 144' can be formed from a conductive material such that the anode segments 140a-n are electrically connected to the electronic components via, at least in part, the spoke 144'.

In some embodiments, the Frisch grid 145 can be implemented using techniques known to those skilled in the art and can be disposed between the cathode 118 and the anode segments 140a-n. The Frisch grid 145 is preferably formed of a conductive material, such as aluminum, gold, silver, and the like, and can function to minimize the effect of uncollected positive ions of electron-ion pairs resulting from an absorption of high-energy photons by the detector medium. The Frisch-grid 145 is placed inside the chamber 110 to electrostatically shield the anode segments 140a-n from ions, although other techniques can be used to achieve the same effect. In some embodiments, the chamber 110, support member 130, anode segments 140a-n, and the Frisch grid 145 are co-axially positioned with respect to each other.

A first electrical potential can be applied to the cathode 118 using a power source 180 (FIG. 1) and a second electrical potential can be applied to one or more of the anode segments 140a-n using one or more power sources 190 (FIG. 1), where the power sources 180 and 190 can be formed as a single unit and/or multiple units. The one or more power sources 190 can be connected to one or more of the anode segments via one or more wires extending through the internal cavity 134 of the support member 130 and the hollow cavity 146 of at least one spoke 144'. The electrical potentials applied to the cathode 118 and anode segments 140a-n are sufficient to create an electric field E within the chamber 110 that tends to direct electrons liberated by an interaction between high-energy photons and the detector medium towards one or more of the anode segments 140a-n. For example, an electrical potential of about 20,000V can be applied to the cathode 118, an electrical potential of about 0V can be applied to one or more of the anode segments, and an electrical potential of about 10,000V can be applied to the Frisch grid 145.

As a result of the electric field generated within the chamber 110, liberated electrons 194, resulting from the ionization of one more particles of the detector medium in response to interaction with high-energy photons, drift towards one or more of the anode segments 140a-n. The liberated electrons 194 are collected by the one or more anode segments 140a-n inducing a charge in the one or more anode segments 140a-n. At least one electrical signal can be generated from the one or more anode segments 140a-n corresponding to the charge induced by the collection of liberated electrons to represent a number of liberated electrons collected.

A determination of a location at which high-energy photons, such as gamma rays, are interacting within the chamber 110 can be made using the multiple discrete and independent anode segments 140a-n disposed at various positions along the longitudinal surface of the support member 130, and which do not extend the longitudinal length 122 of the cylinder 110. For example, high-energy photons can be incident upon the detector medium in proximity to the anode segment 140a resulting in liberated electrons. Due to the proximity of the liberated electrons to the anode segment 140a, a majority of the liberated electrons can drift towards and be collected by the anode segment 140a, while a minority of the liberated electrons can be collected by the remaining anode segments 140b-n. As a result, a determination can be made that the high-energy photons are interacting with the detector medium at a longitudinal position in proximity to the anode segment 140a.

The electronic components 150a-n can be electrically connected to the anode segments 140a-n so that the electronic components 150a-n can receive the electrical signals generated by the anode segments 140a-n in response to the collection of liberated electrons. The electronic components 150a-n can function as preamplifiers that amplify the electrical signals received from the anode segments 140a-n prior to forwarding the electrical signals for further processing. In some embodiments, the electronic components can be application specific integrated circuits (ASICs) developed to perform the pre-amplification of the electrical signals as well as other functions and/or can be configured to convert analog electrical signals received from the anode segments 140a-n into digital electrical signals using an analog-to-digital converter (ADC) 152, which in some embodiments can be converted to optical signals. All, some, or none of the anode segments 140a-n can have a corresponding electronic component 150a-n. For example, in the present embodiment, the anode segments 140a-n have corresponding electronic components 150a-n, respectively. In other embodiments, an electronic component can be electrically coupled to multiple anode segments and/or multiple electronic components can be electrically coupled to a single anode.

The electronic components 150a-n can be placed within the support member 130 in close proximity to their corresponding anode segments 140a-n so that the distance between the anode segments 140a-n and the electronic components 150a-n can be minimized, resulting in short wire lengths between the anode and the electronic components compared to wires that extend the longitudinal length 122 of the chamber 110. By positioning the electronic components 150a-n in close proximity to their corresponding anode segments 140a-n, the parasitic capacitance of the electrical connection between the anode segments 140a-n and the electronic components 150a-n, which can be determined based on the length and diameter of the wire, can be minimized. The electronic components 150a-n can be electrically coupled to a data acquisition device (DAQ) 160 so that the electronic components 150a-n can send the electrical signals received by the anode segments 140a-n to the DAQ 160 for further processing.

The DAQ 160 provides an interface between the electronic components 150a-n and the computing device 170. The DAQ 160 can receive one or more signals, electrical or optical, analog or digital, from one or more of the electronic components 150a-n and store the signals in a buffer. The DAQ 160 can also convert analog electrical signals into digital signals using an ADC 161. The electrical signals can be sent to the computing device 170 for analytical, or other, processing in any suitable manner.

The computing device 170 can be used to store and analyze electrical signals associated with the collection of liberated electrons at the anode segments 140a-n. The computing device 170 can be a mainframe, personal computer (PC), laptop computer, workstation, handheld device, such as a PDA or smart phone, or the like, that can process the electrical signals. In one embodiment, the computing device 170 can be used to determine a pulse-height of the electrical signals received from the anode segments 140a-n that are associated with the charge induced at the anode by the liberated electrons that are collected.

Figure 3:
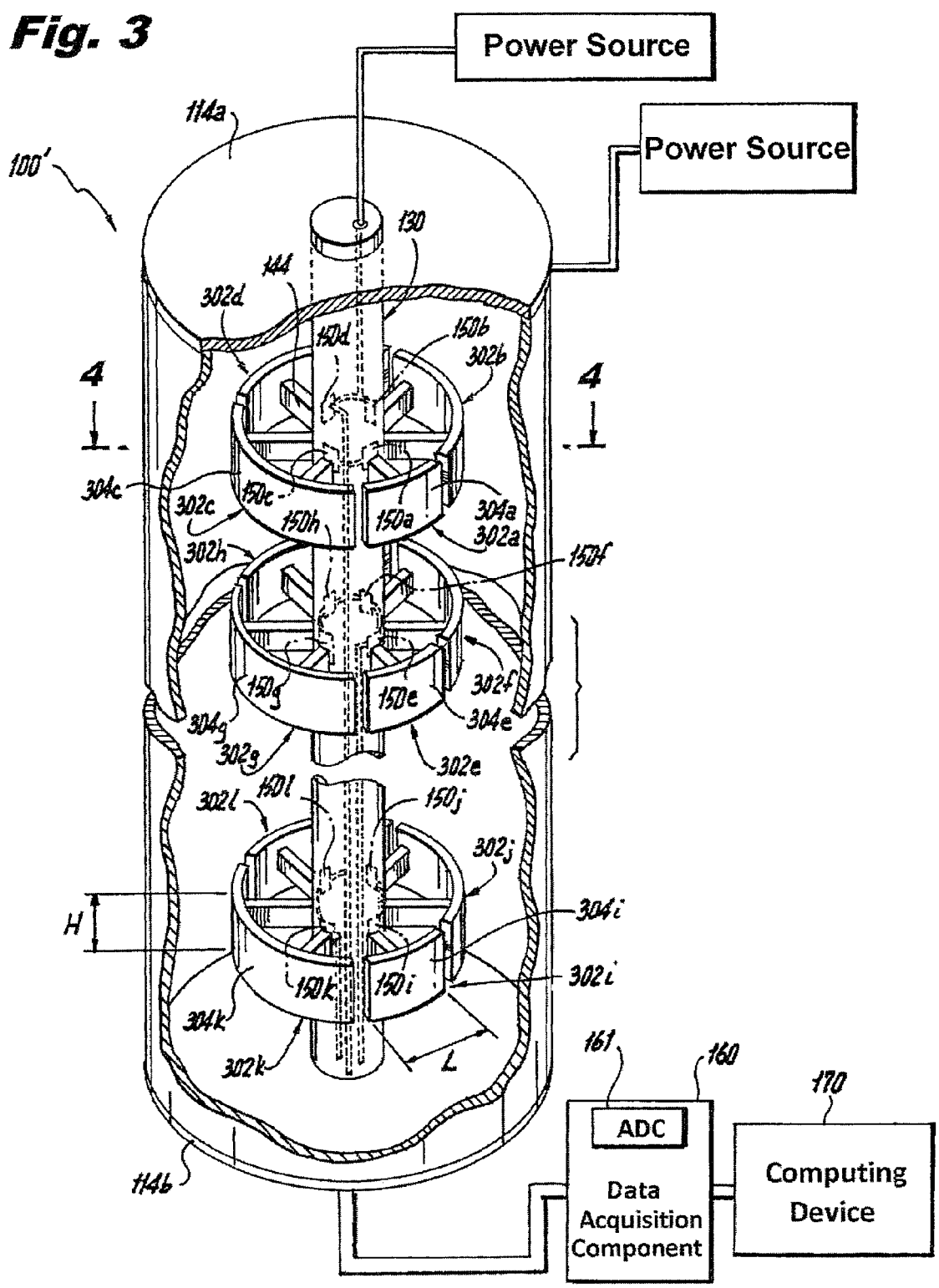
FIG. 3 depicts a portion of a high-energy detector having sectioned anode segments.
Figure 4:
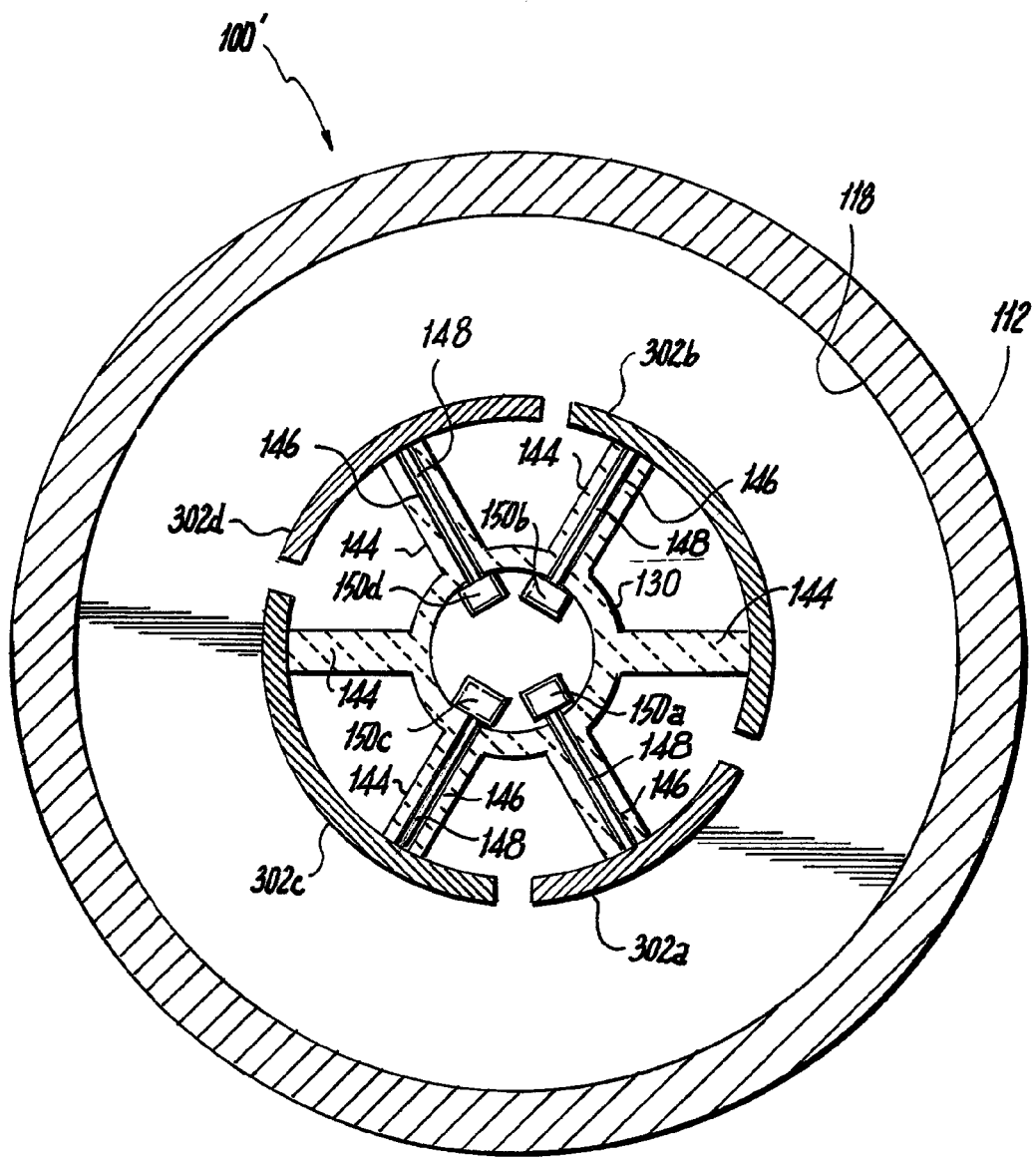
FIG. 4 depicts a cross-sectional view of the high-energy detector of FIG. 3 along the line 4-4.

FIGS. 3 and 4 depict a high-energy detector 100'. The high-energy detector 100' can include the chamber 110 having flanges 114a-b disposed at the ends thereof, the support member 130, the at least one data acquisition component 160, the at least one computing device 170, electronic components 150a-n, and anode segments 302a -n.

In the present embodiment, the anode segments 302a-n can have a generally plate-like configuration, which can be generally planar or can have a curvature so that the anode segments 302a-n can have an arc-like configurations extending at least partially about the support member 130 to form a partitioned or discontinuous annular configuration. The anode segments 302a-n can have broad surfaces 304a-n for collecting liberated electrons of electron-ion pairs. For embodiments where the anode segments 302a-n have a curvature, the curvature can be substantially equivalent to the curvature of the cylindrical surface of the chamber 110, the curvature of the support member 130, and/or a curvature in between that of the surface of the chamber or the support member. The anode segments 302a-n are generally independent and distinct structures that are spaced away from the body 112 of the chamber 110 and are disposed about the support member 130 being mounted thereon via spokes 144 at various positions along the longitudinal and radial surface of the support member 130. At least one of the spokes 144 connecting the anode segments 302a-n to the-support member 130 has the hollowed cavity 146 (FIG. 4) configured as a feed-through so that the anode segments 302a-n can be electrically connected to the electronic components 150a-n housed within the support member 130 via wires 148 (FIG. 4).

A capacitance associated with one of the anode segments (e.g. anode segment 302a) can be determined, in part, based on the length of the anode, where a longer segment results in a larger capacitance, and the dielectric constant of the detector medium. The anode segments 302a-n can have a surface area such that the capacitance of one of the anode segments is, for example, less than about 15 pF and preferably less than about 5 pF.

Figure 5:
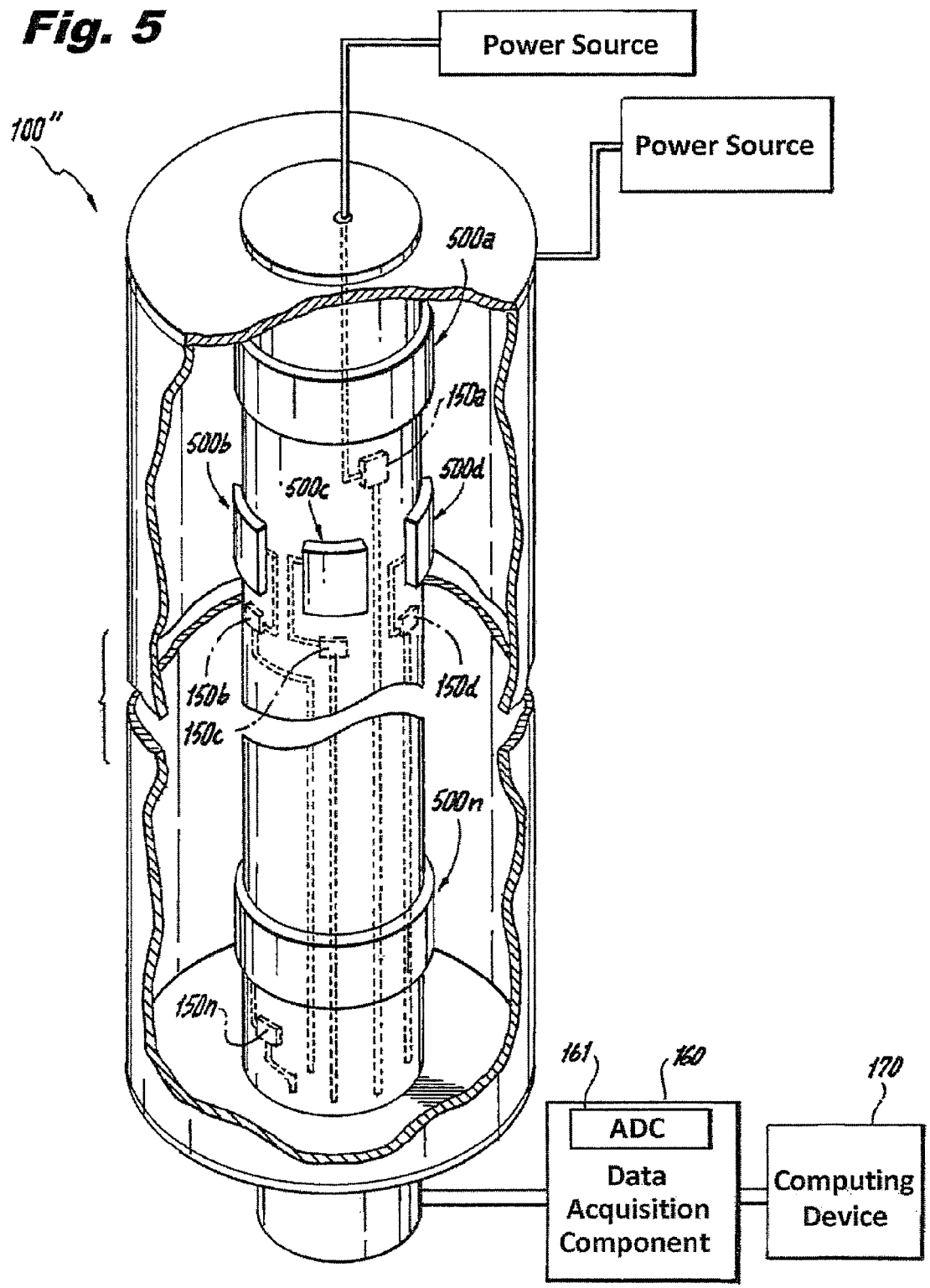
FIG. 5 depicts a portion of a high-energy detector having anode segments integrated on a nonconductive support member.

FIG. 5 depicts another high-energy detector 100" having anode segments 500a-n mounted on the support member 130 without spokes. The anode segments 500a-n can be disposed on and in contact with the support member 130 such that the support member 130 is formed from multiple discrete anode segments 500a-n for collecting liberated electrons of electron-ion pairs separated by sections of a non conductive electromagnetic shielding material. The anode segment 500a can have a continuously formed annular configuration at a first location along the longitudinal surface of the support member 130 such that the anode segment 500a extends about and in contact with the support member 130 to substantially surround the support member 130. The anode segments 500b-d are formed about a second longitudinal location of the support member 130 such that the anode segments 500b-d form a partitioned or discontinuous annular configuration at least partially surrounding, and in contact with, the support member 130.

The electronic components 150a-n disposed within the internal cavity of the support member 130 can be electrically connected to one or more anode segments 500a -n. For example, electronic component 150a can be electrically connected to anode segment 500a and can be positioned in close proximity to minimize the parasitic capacitance of the electrical connection. In the present embodiment, the anode segments 500b and 500c can be electrically connected to electronic component 150b, where electronic component 150b receive the electrical signals from the anode segments 500b and 500c and process the electrical signals prior to send the signals to the DAQ 160.

The configurations of the high-energy detectors disclosed herein result in low capacitance anode segments (e.g., less than 15 pF) and can advantageously minimize the effects of noise, electrical and acoustic, that interferes with the electrical signals generated by the anode segments to provide high-energy resolution of less than about 2.5% full wave half maximum (FWIHM) at 662 keV. The high-energy detectors disclosed herein can facilitate spatial resolution of high-energy photon interaction within the chamber so that the location(s) at which the high-energy photons interact within the chamber can be determined and/or a location of the substance emitting the high-energy photons can be determined.

Figure 6:
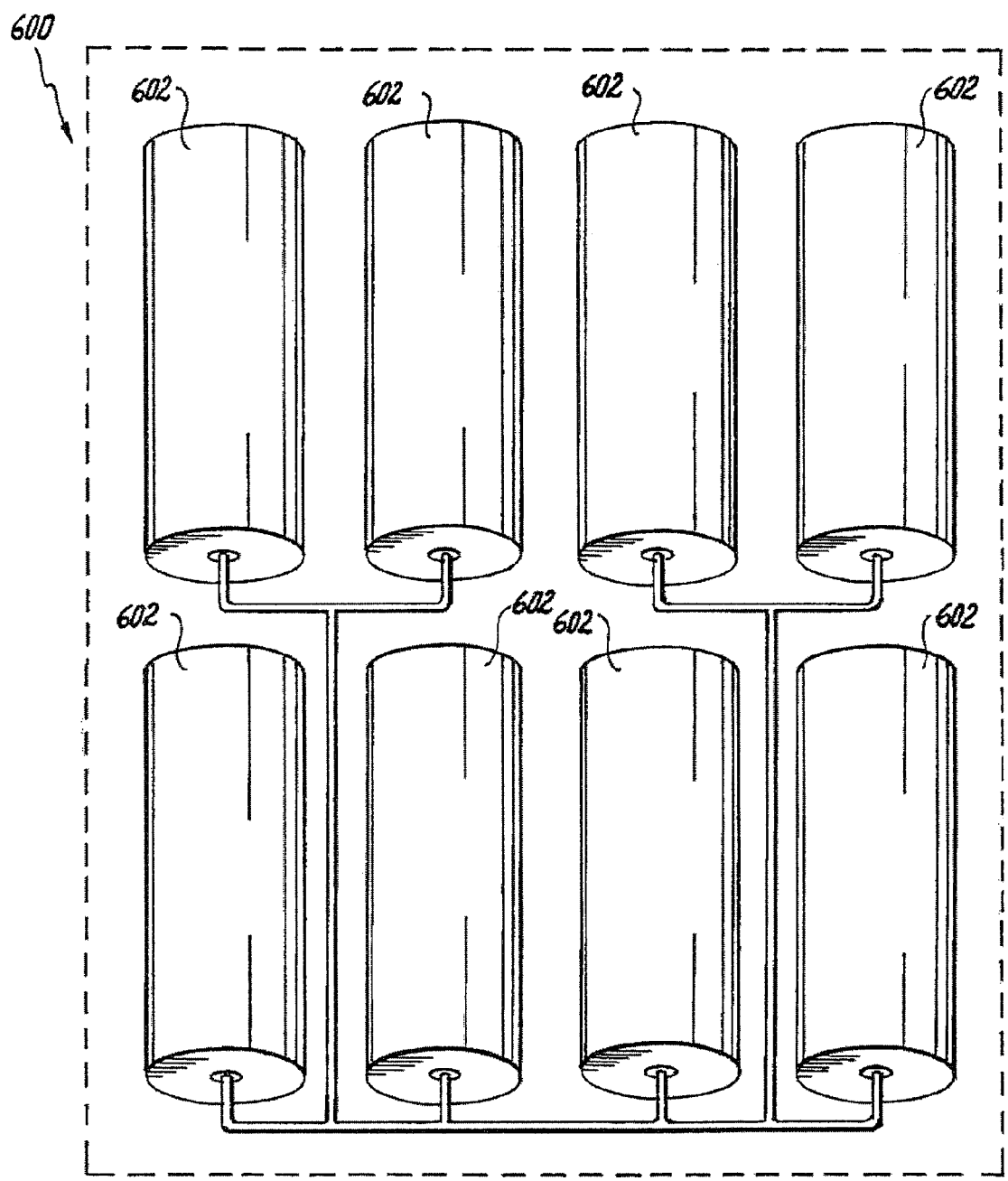
FIG. 6 depicts an array of high-energy detectors in accordance with the preferred embodiments of the present invention.

FIG. 6 depicts an array or matrix 600 (hereinafter "array 600") of high-energy detectors 602 that can be formed using one or more of the high-energy detectors 100, 100', and 100" (high-energy detectors 100, 100', and 100" are collectively referred to hereinafter as "high-energy detector 602"). The array 600 of high-energy detectors 602 can be formed to facilitate a large area, position-sensitive gamma-ray detector for spectroscopy and imaging of gamma-rays produced by radiation sources. In the illustrated example, a two-by-four (2×4) array can be formed using the high-energy detector 602. Implementing the array 600 of high-energy detectors 602 can increase the energy resolution and sensitivity of the device to facilitate increased accuracy and performance. The array 600 of high-energy detectors 602 can be housed in an enclosure to increase the durability. While the present example illustrates a 2×4 array those skilled in the art will recognize that arrays and matrices of different dimensions can be implemented, such as for example, a 4×4 array.

Figure 7:
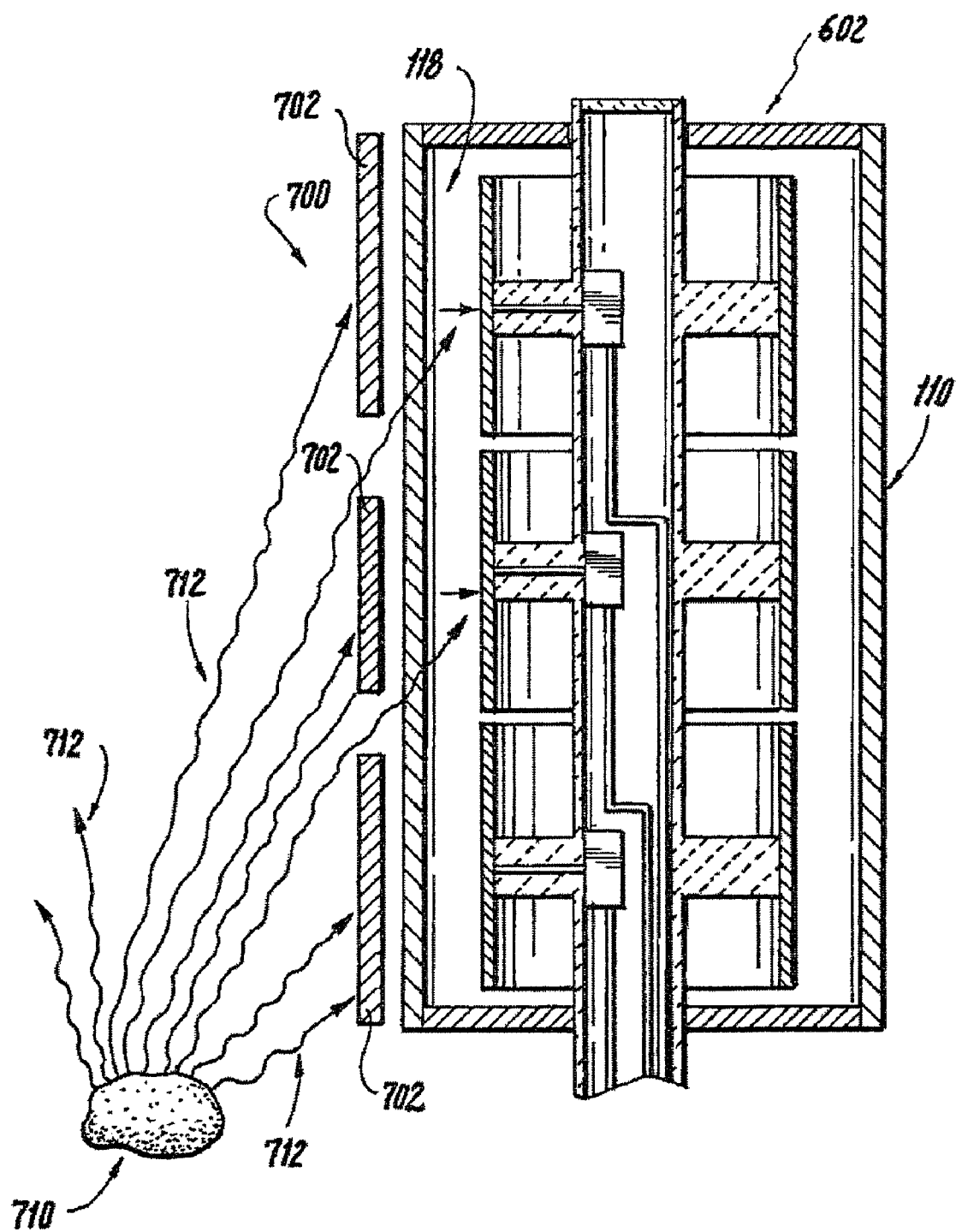
FIG. 7 depicts a high-energy detector used in combination with a masking component to facilitate a determination of the direction from which the high-energy photons are impinging a detector medium.

FIG. 7 depicts one of the high energy detectors 602 used, in combination, with a masking component 700 to generate patterns of high-energy photons to facilitate a determination of the direction from which the high-energy photons are impinging the detector medium. The masking component 700 can be disposed external to the chamber 110 and can include one or more blocking sections 702 formed from a material that is substantially impermeable to electromagnetic radiation, such as gamma rays, to substantially prevent high-energy photons from passing therethrough. The blocking sections 702 can be spaced to allow some high-energy photons to pass by. In one embodiment, the blocking sections can be substantially linear and in other embodiments the blocking sections can be curved to extend at least partially about the chamber 110 to at least partially surround the chamber 110.

In the present example, a substance 710 that emits high-energy photons 712, such as gamma rays, x-rays, or the like, is located near the high-energy detector 602 and with the masking component 700 disposed therebetween. The high-energy photons 712 can radiate towards the high-energy detector 602. Due to the relation of the substance 710 to the masking component 700, some of the high-energy photons 712 can impinge upon the blocking sections 702, while other high-energy photons 712 can radiate in between the blocking sections 702 and through the chamber 110 to interact with the detector medium disposed therein resulting in the generation of electron-ion pairs. The liberated electrons can drift towards one or more of the anode segments, such as those anode segments disclosed herein, as a result of an electrical field generated between the cathode 118 and the anode segments. In the present example a determination can be made that the substance is lower than the detector since the bottom anode segment of the detector 602 collects fewer liberated electrons than the remaining anode segments.

The preferred embodiments can be used in a fixed and/or portable application where the detection of high-energy photons is desired. In one example, the preferred embodiments of the detectors described herein can be used in a laboratory where samples may be place in proximity to the detectors and for which the detectors can determine the composition of the samples based on the high-energy photons emitted from the samples. In another example, the high-energy detectors described herein can be used in a portable field application where the detectors can be used to determine the composition of materials. As a result of the preferred embodiments of the present invention, operators of the high-energy detectors described herein can locate and identify radioactive material with higher resolution and more accurately than with conventional high-energy detectors.

While preferred embodiments of the present invention have been described herein, it is expressly noted that the present invention is not limited to these embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made explicit herein, without departing from the spirit and scope of the invention.

The invention claimed is:

1. A high-energy, ionizing radiation detector comprising:
a cathode chamber extending along a central longitudinal axis;
a detector medium at high pressure, above one atmosphere, within said cathode chamber disposed to interact with incident high-energy photons or other radiation and generate electron-ion pairs;
a support member centrally fixed within said cathode chamber, said support member having an internal cavity in which at least one electrical component configured to receive electrical signals is disposed and through which electrical signals are routed; and
a plurality of anode segments supported by said support member and configured to generate at least a first electrical signal in response to electrons impinging thereon, said plurality of anode segments electrically connected to said at least one electrical component disposed within said support member and being spaced along a longitudinal surface of said support member and coaxially around said longitudinal surface of said support member, said plurality of anode segments having a physical displacement from said central longitudinal axis of said cathode chamber greater than a physical displacement of said longitudinal surface of said support member from said central longitudinal axis of said cathode chamber, wherein each of said plurality of anode segments does not define an individuated one of a collection of contiguous, insulated ionizing radiation detector cathode chambers.

2. The high-energy, ionizing radiation detector of claim 1, wherein said plurality of anode segments are positioned to facilitate an identification of at least one location associated with a point of interaction between high-energy photons and said detector medium disposed within said cathode chamber.

3. The high-energy, ionizing radiation detector of claim 2, wherein said at least one location represents a position of interaction along said longitudinal axis.

4. The high-energy, ionizing radiation detector of claim 2, wherein said at least one location represents a position of interaction about said support member.

5. The high-energy, ionizing radiation detector of claim 1, wherein at least one of said plurality of anode segments is spaced away from said support member and said high-energy, ionizing radiation detector further comprises:
at least one spoke extending between said support member and said at least one of said plurality of anode segments to mount said at least one of said plurality of anode segments to said support member.

6. The high-energy, ionizing radiation detector of claim 5 further comprising:
said at least one electronic component disposed within said support member, wherein said at least one spoke has an internal cavity through which an electrical conductor is routed to electrically connect said at least one of said plurality of anode segments and said at least one electronic component.

7. The high-energy, ionizing radiation detector of claim 1, wherein at least one of said plurality of anode segments has an arc-like configuration at least partially surrounding said support member.

8. The high-energy, ionizing radiation detector of claim 1, wherein at least one of said plurality of anode segments at least partially surround said support member.

9. The high-energy, ionizing radiation detector of claim 1, wherein at least one of said plurality of anode segments has a surface area configured to generate an individual effective capacitance for said at least one of said plurality of anode segments of less than about 15 picofarads (pF) for a given radial displacement between said at least one of said plurality of anode segments and an inner wall of said cathode chamber.

10. The high-energy, ionizing radiation detector of claim 1, wherein at least one of said plurality of anode segments has a surface area configured to generate an individual effective capacitance for said at least one of said plurality of anode segments of less than about 5 picofarads (pF) for a given radial displacement between said at least one of said plurality of anode segments and said cathode chamber.

11. The high-energy, ionizing radiation detector of claim 1, further comprising:
at least one conductive Frisch grid coaxially disposed between an inner wall of said cathode chamber and said plurality of anode segments.

12. The high-energy, ionizing radiation detector of claim 11, wherein said at least one conductive Frisch grid is composed of gold, silver, and/or other noble metals.

13. The high-energy, ionizing radiation detector of claim 11, wherein said at least one conductive Frisch grid is composed of aluminum and/or other base metals.

14. The high-energy, ionizing radiation detector of claim 1, wherein a pressure inside said internal cavity of said support member is different from a pressure inside said cathode chamber.

15. The high-energy, ionizing radiation detector of claim 14, wherein a pressure inside said internal cavity of said support member is one atmosphere pressure.

16. The high-energy, ionizing radiation detector of claim 1, wherein said detector medium is a noble gas including xenon, argon, and krypton, or a combination of these gases.

17. The high-energy, ionizing radiation detector of claim 16, wherein said detector medium is a noble gas or a combination of said noble gases and an organic admixture.

18. The high-energy, ionizing radiation detector of claim 16, wherein said detector medium is a noble gas or a combination of said noble gases and helium-3.

19. The high-energy, ionizing radiation detector of claim 1, wherein said detector medium is held at a pressure between 20 to 100 bar.

20. The high-energy, ionizing radiation detector of claim 1, wherein said detector medium is held at a pressure between 50 to 70 bar.

21. An ionization chamber comprising:
a cathode disposed on an internal longitudinal surface of said ionization chamber;
a detector medium at high pressure, above one atmosphere, within said cathode chamber disposed to interact with incident high-energy photons or other radiation and generate electron-ion pairs;
a support member centrally disposed within said ionization chamber and extending along a longitudinal axis of said ionization chamber, said support member having an internal cavity in which at least one electrical component configured to receive electrical signals is disposed and through which electrical signals are routed;
a plurality of discrete anode segments configured to generate at least a first electrical signal in response to electrons impinging thereon, said plurality of anode segments electrically connected to said at least one electrical component disposed within said support member and being spaced along a longitudinal surface of said support member and coaxially around said longitudinal surface of said support member, said plurality of anode segments having a physical displacement from said central longitudinal axis of said cathode chamber greater than a physical displacement of said longitudinal surface of said support member from said central longitudinal axis of said cathode chamber, wherein each of said plurality of anode segments does not define an individuated one of a collection of contiguous, insulated ionizing radiation detector cathode chambers; and
said at least one electronic component positioned within said support member in proximity to at least one of said plurality of anode segments, the position of said at least one electronic component being configured to minimize an effect of acoustic noise.

22. The ionization chamber of claim 21, wherein at least one of said plurality of anode segments forms a continuous annular structure about said support member.

23. The ionization chamber of claim 20, wherein said at least one of said plurality of anode segments is mounted on said support member via at least one spoke so that said at least one of said plurality of anode segments is spaced away from said support member.

24. The ionization chamber of claim 21, wherein at least two of said plurality of anode segments are formed about said support member in a partitioned annular configuration.

25. The ionization chamber of claim 21, wherein said plurality of anode segments are configured to facilitate a determination of a location within said ionization chamber at which high-energy photons are interacting with said detector medium disposed therein.

26. The ionization chamber of claim 21, further comprising a masking component external to said ionization chamber.

27. An array of ionization chambers configured to detect high-energy photons capable of causing particle ionization in a detector medium, the array comprising:
a plurality of ionization chambers, each ionization chamber comprising:
a cathode disposed on an internal longitudinal surface of said ionization chamber;
a detector medium at high pressure, above one atmosphere, within said cathode chamber disposed to interact with incident high-energy photons or other radiation and generate electron-ion pairs;
a support member centrally disposed within said ionization chamber and extending along a longitudinal axis of said ionization chamber, said support member having an internal cavity in which at least one electrical component configured to receive electrical signals is disposed and through which electrical signals are routed;
a plurality of discrete anode segments configured to generate at least a first electrical signal in response to electrons impinging thereon, said plurality of anode segments electrically connected to said at least one electrical component disposed within said support member and being spaced along a longitudinal surface of said support member and coaxially around said longitudinal surface of said support member, said plurality of anode segments having a physical displacement from said central longitudinal axis of said cathode chamber greater than a physical displacement of said longitudinal surface of said support member from said central longitudinal axis of said cathode chamber, wherein each of said plurality of anode segments does not define an individuated one of a collection of contiguous, insulated ionizing radiation detector cathode chambers; and
said at least one electronic component positioned within said support member in proximity to at least one of said plurality of anode segments, the position of said at least one electronic component being configured to minimize an effect of acoustic noise;
said plurality of ionization chambers housed in a durable enclosure.

* * * * *